Jan. 21, 1964 C. W. BENT ETAL 3,118,555
MATERIAL HANDLING APPARATUS
Filed Dec. 22, 1961 2 Sheets-Sheet 1

INVENTORS
CHARLES W. BENT
KENNETH H. MINDRUM
BY
*J. C. Wiessler*
ATTORNEY

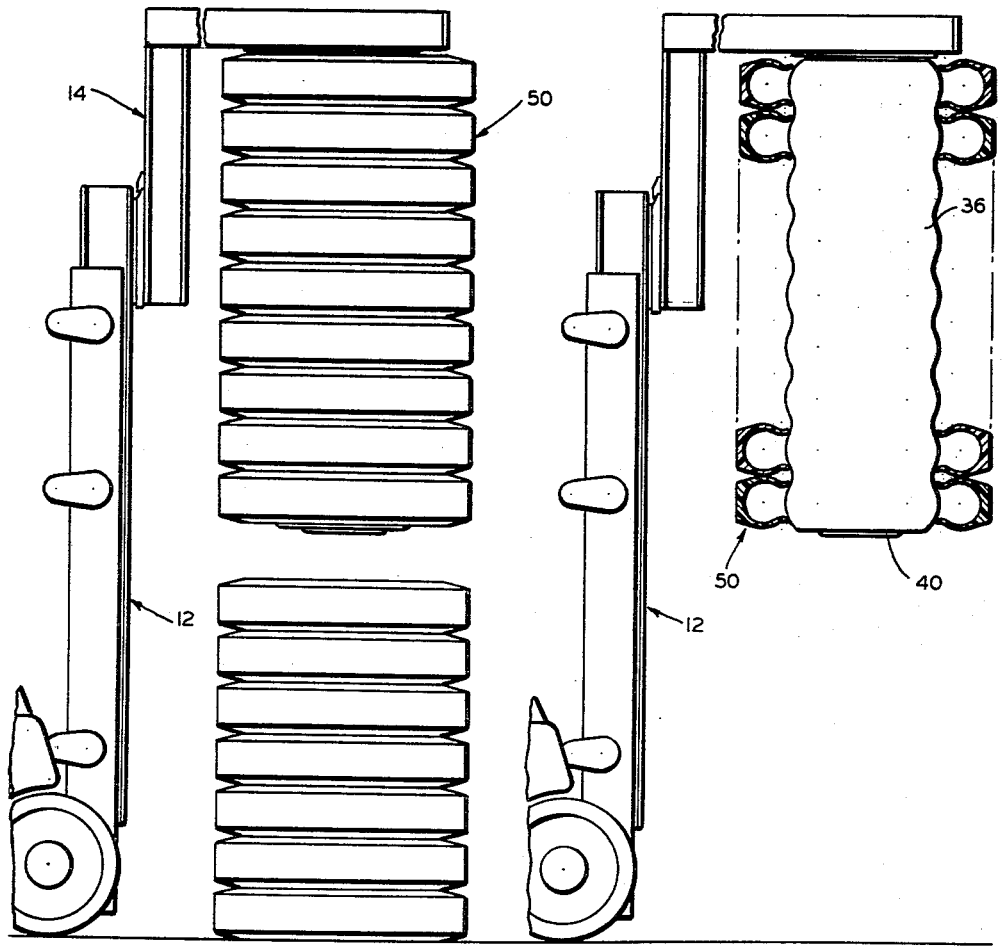

United States Patent Office 3,118,555
Patented Jan. 21, 1964

3,118,555
MATERIAL HANDLING APPARATUS
Charles W. Bent, Hickory Corners, and Kenneth H. Mindrum, Battle Creek, Mich., assignors to Clark Equipment Company, a corporation of Michigan
Filed Dec. 22, 1961, Ser. No. 161,547
8 Claims. (Cl. 214—651)

This invention relates to material handling apparatus and more particularly to an inflatable tube means for engaging and transporting certain types of material. This invention has been found to be well adapted for use as an attachment with industrial lift trucks and the like.

It has long been a problem to efficiently handle multiple units of hollow bodies, such as tires, in warehousing operations and the like, in a manner which permits stacks of such bodies to be stored in rows in close side-by-side relation and extending vertically to elevations wherein head room requirements are minimized. In the handling of tires or other hollow bodies presently available handling apparatus is subject to one or more limitations or deficiencies not present in the instant invention. For example, one device for handling stacks of tires is disclosed in U.S. Patent No. 2,687,226, in which is utilized four steel rams which are insertable inside a stack of tires. The hydraulic cylinder is extensible in the mechanism to cause the lower ends of the ram to move outwardly from the center, thus gripping the tires at the lower end of the stack. Aside from the bulk and relative complexity of the device, it is subject to the very serious limitation that in use it requires space above the stack of tires which is not much less than the height of the stack being handled. Other apparatus has been devised which is capable of clamping the tires from the sides thereof, but this is also relatively bulky and expensive and requires the vertical stacks to be located in spaced relation to each other so as to allow room for passage of clamp arms therebetween which are then actuated to engage opposite outer peripheral portions of the stack. Also, of course, the height of such clamp arms must necessarily equal the height of the stack to be handled. Other types of devices have been considered for the purpose contemplated, but none heretofore have solved the problem in as efficient and relatively simple a manner as the present invention, which is capable of handling relatively large stacks of multiple hollow bodies, such as tires, which may be stacked to nearly ceiling height of covered storage facilities and in adjacent rows which provide merely sufficient room between the rows to permit vertical stacks of such material to be deposited and removed without contact with adjacent stacks.

In carrying out our invention we have provided an expansible flexible tube or bag which is insertable inside a plurality of hollow bodies, subsequent to which the device is expanded both axially and transversely to engage the inner periphery of such bodies, whereupon the engaged articles may be transported to another location. One particular embodiment of the invention is disclosed herein for use as an attachment with lift trucks, and provides an expansible convoluted bag which is adjustable in a direction longitudinal of the truck and is expansible when inflated to about three times its collapsed height. Additional ratio of expansion to contraction can be obtained by providing, in addition to air pressure, a vacuum producing connection attached to the inflatable member for causing it to collapse to a height less than its free nonexpanded height.

It is a primary object of the present invention to provide an improved material handling apparatus for engaging and transporting hollow bodies.

It is another important object of the present invention to provide material handling apparatus for hollow bodies capable of being expanded to engage hollow bodies of substantially greater length than the unexpanded length of the apparatus.

Another object of the present invention is to provide a bag which is expansible longitudinally and circumferentially for handling hollow bodies of greater axial length than the collapsed length of the bag.

A further object of the invention is to provide an attachment for lift trucks movable over and into stacks of material such as tires, with an overhead clearance relative to the stack to be engaged which is substantially less than the length of said stack.

Other objects, advantages and features of the present invention will become apparent to persons skilled in the art following the detailed description hereinbelow taken in conjunction with the drawings wherein:

FIGURE 4 is a side view in elevation showing the handling apparatus in an elevated position and in engagement with a stack of tires; and FIGURE 5 is a view in partial section similar to FIG. 4 showing the inflatable bag in expanded and extended position in engagement with the stack of tires.

Figure 1:
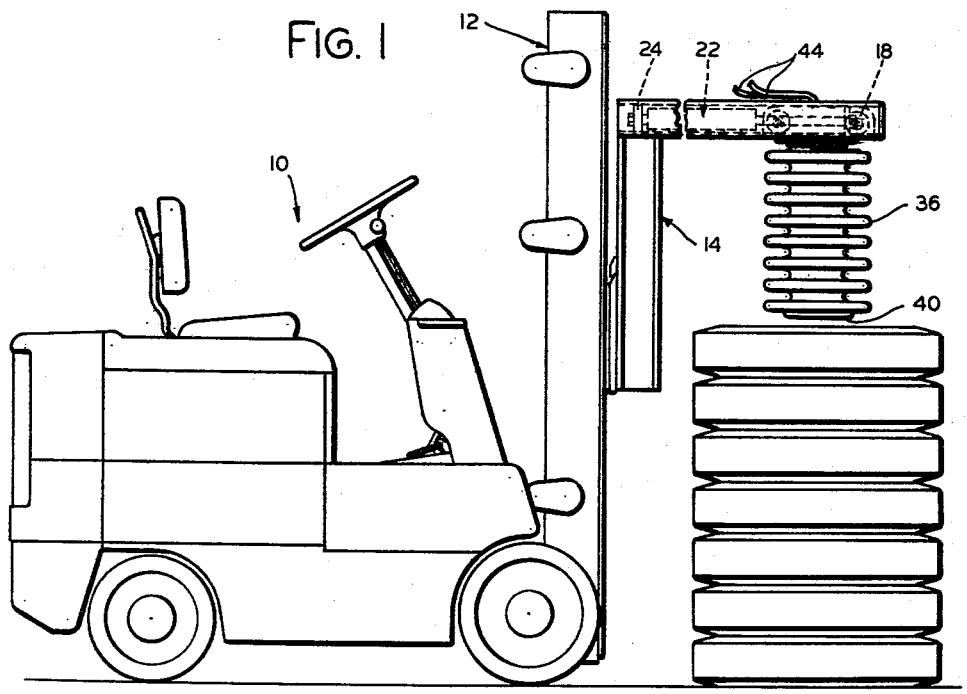
FIGURE 1 is a view in side elevation showing our invention in use with a lift truck.
Figure 2:
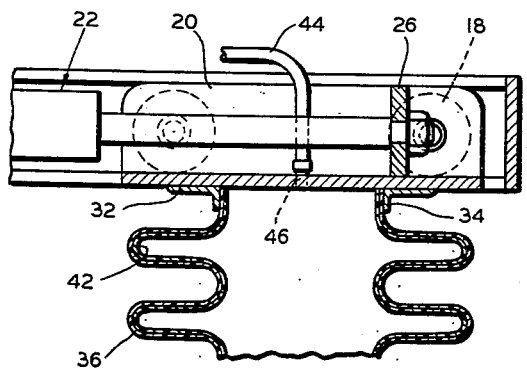
FIGURE 2 is an enlarged sectional side view of a portion of the handling apparatus shown in FIG. 1.
Figure 3:
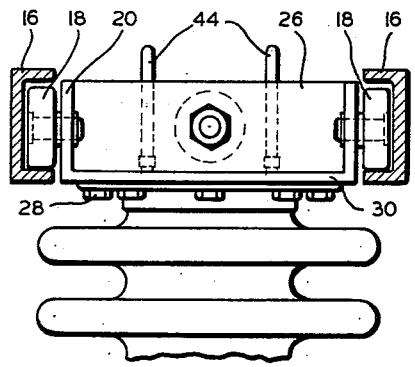
FIGURE 3 is an end view in partial section of the apparatus shown in FIG. 2.

Referring now to the drawings in detail, an industrial lift truck of conventional design is illustrated at numeral 10; it includes an upright mast construction 12 located at the forward end thereof having a generally inverted L-shaped load supporting carriage 14 extending longitudinally and forwardly of the mast construction and adapted to be elevated by the mast construction in a well-known manner. The forwardly extending portion of the inverted L-shaped assembly 14 includes a pair of laterally spaced and inwardly facing channel members 16 secured to the vertical leg members and in registry with two transversely spaced pairs of roller members 18 adapted for rolling engagement within the channel members 16 and secured together by a transverse bracket 20 so that the bracket and pair of rollers together comprise a longitudinally movable supporting carriage. A double-acting hydraulic cylinder and piston assembly 22 is connected at the cylinder end thereof to a transverse bracket 24 which extends between and is secured adjacent the rearward ends of channel members 16; it is connected at the piston rod end to a transverse bracket member 26 which is secured to bracket 20.

Secured by a ring of bolts 28 to the lower surface of a transversely extending bottom plate 30 of bracket 20 is an annular adaptor member 32 having a boss 34 which is suitably secured, as by bonding, to an upper open end of a convoluted flexible bag 36 having a lower closed end 40 and capable of being expanded under pressure to a length about three times the length of its unexpanded free height. Bag 36 may be fabricated from layers of rubber or other suitable material and preferably has a plurality of parallel circumferentially spaced warp threads 42 which run longitudinally of the bag between the two layers of rubber, as shown in the exemplary embodiment, so as to reinforce and strengthen the bag structure. A pair of air hoses 44 are connected to apertures 46 in plate member 30 and are adapted to be supplied by air pressure and vacuum supply means, not illustrated, which may be suitably located on the truck 10. As air pressure is introduced into one of the hoses 44 the bag is inflated in longitudinal extension and circumferential expansion from its collapsed condition, FIG. 1, to a condition such as illustrated in FIG. 5 wherein the convolutions and flexibility of the bag have permitted its extension to the length of the stack of tires 50, while also permitting expansion of the bag circumferentially so that the outer wall thereof engages and conforms to the inner peripheral configuration of tire stack 50.

Following such engagement, inverted L-shaped assembly 14 may be elevated in mast 12 to clear the unengaged portion of the stack, whereupon the truck 10 may be moved in a reverse direction and maneuvered to transport and redeposit stack 50 in another location. The stack is disengaged by evacuating the air within the bag 36 so that it returns to its original shape as shown in FIG. 1. This may be accomplished either by merely venting the bag to atmosphere, or, preferably, by connecting the other hose 44 to positive evacuating means which accelerates the process and also permits the bag to be deflated to a condition wherein the collapsed height thereof is less than that which would be obtainable by merely venting the bag to atmosphere. The particular bag design and the air pressure which is supplied to the bag in combination with the degree of evacuation thereof determines the ratio of extension to contraction of the bag in operation and, therefore, the ratio of the height of the tire stack which can be handled to the overhead clearance required above the stack in order to move the bag into the position shown in FIG. 1 wherein the bag is ready to be lowered into the stack for subsequent extension and expansion to engage the stack.

It will now be appreciated that our invention provides a relatively simple construction for handling one or a plurality of hollow bodies which may be disposed in any attitude relative to a vertical position and engaged, transported and deposited with minimum clearance requirements relative to one end of the hollow body or bodies in relation to the length thereof. Regarding the attitude of the hollow body or bodies relative to a vertical position, it will be apparent to persons skilled in the art that a device of the type contemplated may be readily combined, for example, with rotating mechanism of well-known type supportable for elevation in upright assembly 12 for actuating the bag assembly in a rotary direction to engage hollow bodies which may be disposed in any position between horizontal and vertical positions. Many other uses of the present invention will become apparent to persons skilled in the art.

Although only one physical embodiment of the invention has been illustrated and described, such disclosure obviously constitutes a teaching which will enable those skilled in the art to practice the invention and to make various changes in the construction, form and relative arrangement of parts to suit individual requirements without departing from the scope of the invention.

We claim:

1. Apparatus for handling vertical stacks of tires and the like in locations, such as warehouses, wherein such tires and the like may be stacked by such apparatus to near ceiling elevation, comprising a material handling device movable over the top of a vertical stack of tires having a downwardly depending elongated expansible bag, a plurality of vertically spaced and circumferentially extending convolutions formed in the wall of said bag, fluid pressure supply means connected to said bag for communicating pressure fluid thereto whereby to inflate said bag, and means associated with said material handling device for adjusting said bag into the cylindrical opening formed by the stack of tires, whereupon inflation of said bag by pressure fluid causes it to expand axially a distance which is a multiple of the non-expanded length of the bag by tending to straighten said convolutions and to expand circumferentially into holding engagement with the generally cylindrical inner wall formed by said stack of tires, whereupon the stack of tires engaged by said bag is transportable by said material handling device and apparatus for deposit in a second location.

2. Apparatus for handling vertical stacks of objects, such as tires, having a central opening therethrough, comprising a material handling device movable over the top of a vertical stack of such objects having a downwardly depending expansible bag, a plurality of vertically spaced and circumferentially extending convolutions formed in the wall of said bag, fluid pressure supply means connected to said bag for communicating pressure fluid thereto whereby to inflate said bag, and means associated with said material handling device for adjusting said bag into the opening formed by the stack of such objects, said bag being expandable axially a distance which is a multiple of the non-expanded length of the bag as said convolutions tend to straighten and expandible circumferentially into holding engagement with the inner wall formed by the stack of objects.

3. Apparatus for handling vertical stacks of tires and the like comprising a material handling device movable over the top of a vertical stack of tires having a downwardly depending expansible bag closed at the bottom end and open at the top end thereof, a plurality of circumferential convolutions formed in the wall of said bag, means sealing and supporting the open end of said bag, fluid pressure supply means connected to the top end of said bag for communicating pressure fluid thereto whereby to inflate said bag, and means for actuating said bag sealing and supporting means so as to adjust said bag into the cylindrical opening formed by the stack of tires, pressure fluid supplied to said bag causing it to expand axially and circumferentially into holding engagement with the generally cylindrical inner wall formed by said stack of tires, whereupon the stack of tires engaged by said bag is transportable by said material handling device and apparatus for deposit in a second location.

4. Apparatus as claimed in claim 2 wherein means is connected to said bag for lowering the fluid pressure therein below the pressure of the surrounding atmosphere.

5. Apparatus for handling vertical stacks of tires and the like comprising a material handling device having load support means, means for elevating said load support means, boom means extending outwardly of said load support means and a trolley means mounted in said boom means and actuatable toward and away from said load support means, and a downwardly depending expansible bag mounted on said trolley means and having a plurality of circumferentially extending convolutions formed in the wall thereof, said bag being sealed at both ends to provide an expansible fluid pressure chamber and actuatable with said trolley means, fluid pressure supply means connected to said bag for communicating pressure fluid thereto whereby to inflate said bag, said trolley means and elevating means being operable to position said bag in the cylindrical opening formed by the stack of tires, whereby inflation of said bag by pressure fluid causes it to expand axially and circumferentially into holding engagement with the generally cylindrical inner wall formed by said stack of tires, whereupon the stack of tires engaged by said bag is transportable by said material handling device.

6. An attachment for industrial trucks having an upright at one end thereof and boom means extending forwardly of said upright for elevating movement therein, comprising a downwardly depending elongated expansible bag sealed from the surrounding atmosphere and supported from said boom means, a plurality of vertically spaced and circumferentially extending convolutions formed in the wall of said bag, fluid pressure supply means connected to said bag for communicating pressure fluid thereto whereby the inflate said bag, said bag being movable vertically with said boom means and positionable in an opening formed by stacks of tires and the like, whereby inflation of said bag by pressure fluid causes it to expand axially and circumferentially into holding engagement with the inner wall formed by such stacks of tires and the like.

7. An attachment as claimed in claim 6 wherein said bag is adapted to expand axially a distance which is a multiple of the non-expanded length of the bag by tending to straighten said convolutions, and trolley means movable along said boom means, said bag being secured to and depending from said trolley means.

8. An attachment as claimed in claim 6 wherein fluid pressure evacuating means is connected to said bag for reducing the pressure therein below the pressure of the surrounding atmosphere whereby to shorten said bag axially to a length less than the length thereof when said bag is subjected internally to atmosphere pressure.

References Cited in the file of this patent

UNITED STATES PATENTS

| | | |
|---|---|---|
| 2,784,997 | Baumann | Mar. 12, 1957 |
| 2,928,540 | Cunningham | Mar. 15, 1960 |
| 2,998,892 | Menzel et al. | Sept. 5, 1961 |

FOREIGN PATENTS

| | | |
|---|---|---|
| 1,204,606 | France | Aug. 10, 1959 |
| 1,238,423 | France | July 4, 1960 |